United States Patent [19]
Welk, Jr.

[11] 3,788,357
[45] Jan. 29, 1974

[54] FLUIDIC DRIVER ALERTNESS SYSTEM
[75] Inventor: Horace B. Welk, Jr., Churchville, Pa.
[73] Assignee: Casco Products Corporation, Bridgeport, Conn.
[22] Filed: Mar. 31, 1972
[21] Appl. No.: 240,151

[52] U.S. Cl.............. 137/805, 137/819, 137/825, 235/201 ME, 340/52 R, 340/279
[51] Int. Cl. ............................................. F15c 1/12
[58] Field of Search .........340/53, 54, 279; 137/805, 137/804, 819, 825; 235/201 ME, 200 F

[56] References Cited
UNITED STATES PATENTS

| | | | |
|---|---|---|---|
| 3,611,344 | 10/1971 | Couper | 340/279 |
| 3,623,777 | 11/1971 | Sarbach | 340/279 X |
| 3,106,981 | 10/1963 | Chakiris | 340/53 X |
| 3,478,731 | 11/1969 | Morton et al. | 137/81.5 X |
| 3,626,473 | 12/1971 | Posingies | 137/81.5 |
| 2,851,120 | 9/1958 | Fogiel | 340/53 X |
| 3,043,952 | 7/1962 | Reid | 340/53 UX |
| 3,085,646 | 4/1963 | Paufve | 340/53 X |
| 3,203,501 | 8/1965 | Carter et al. | 340/53 X |
| 3,222,640 | 12/1965 | Wurst | 340/53 |
| 3,490,408 | 1/1970 | Monge et al. | 137/81.5 X |
| 3,608,572 | 9/1971 | Hass | 137/81.5 |
| 3,704,045 | 11/1972 | Walsh | 137/81.5 X |

Primary Examiner—Samuel Scott
Attorney, Agent, or Firm—J. Patrick Cagney

[57] ABSTRACT

A flueric computer operates on specified fluidic input signals to produce output signals which will, in turn, activate an audible warning sound, then a vehicle braking action if predetermined conditions are not satisfied. The computer uses all fluidic digital logic and is comprised of an oscillator, multiple binary counter stages and the necessary digital logic elements to perform its function.

5 Claims, 4 Drawing Figures

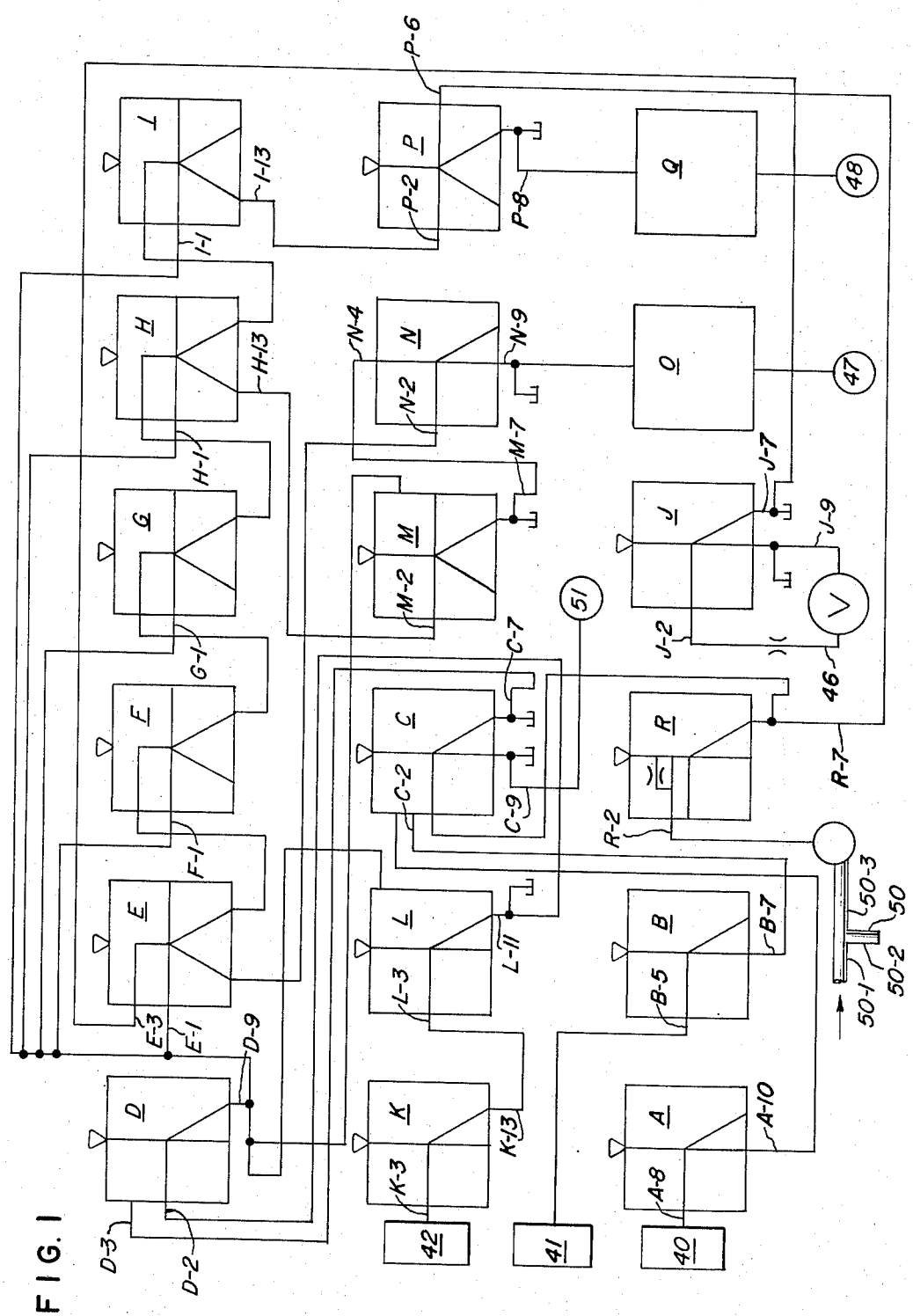
FIG. I

FLUIDIC DRIVER ALERTNESS SYSTEM

BACKGROUND OF THE INVENTION

Statistics compiled by various insurance companies and the Department of Transportation show that a large number of vehicular accidents are caused by vehicle operators who fall asleep while driving. Tests in instrumented vehicles sponsored by these insurance companies and the Department of Transportation show that a definite pattern of steering wheel activity (frequency and magnitude of steering wheel deviation) is characteristic of a normally alert driver.

The information accumulated from reams of recorded test data from instrumented vehicles has been used to generate the input and output requirements for a computer which is intended to alert a sleeping driver if his steering wheel activity falls below a preselected norm and which will bring the vehicle to a full stop if his measured response to an alarm does not conform to the minimum response of a normally alert driver.

A number of electro-mechanical and electronic alertness systems for vehicles are known but these are not considered satisfactory. Electro-mechanical systems are cumbersome and costly while electronic systems are clostly and are of questionable reliability due to the environmental conditions existing in the vehicles.

SUMMARY OF THE INVENTION

It is the general purpose of this invention to provide a fluidic computer which will operate on specified fluidic input signals and provide fluidic output signals which will either arouse the sleeping driver of a vehicle or, failing that, will activate the braking system of the vehicle. The computer makes use of low pressure compressed air as its working fluid, does not use electricity and contains no moving mechanical parts. The fluidic computer of this invention provides maximum reliability at minimum cost.

The required fluidic input signals are vehicle velocity, steering wheel position and the frequency and magnitude of steering wheel deviation. The output signals are fluidic and will first produce a signal which will cause an air horn to emit a repetitive, pulsating blast. Failure of the driver to initiate steering wheel motion, of a predetermined frequency and magnitude, will result in an output signal from the computer, to the air brake system of the vehicle, which will bring the vehicle to a complete stop. The computer contains an oscillator, binary counter stages and an assortment of fluidic digital logic elements to accomplish its purpose.

Additionally, the vehicles for which this invention is primarily intended, have air compressors to supply the necessary working fluid for the computer and associated sensors and also have a compressed air braking system to which the computer output can be directly connected thus eliminating interface problems which would be required with an electromechanical system. Since the flueric circuit consists solely of low pressure air flowing through interconnected logic elements the complete computer can be injection molded to result in an ultra reliable, low cost vehicle safety system.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the specification, and in which like numerals are employed to designate like parts throughout the same:

FIG. 1 is a schematic of a fluidic computer circuitry showing the typeS of digital logic elements used and the interconnection of the logic elements to perform the required functions;

DESCRIPTION OF PREFERRED EMBODIMENT

Figure 2:
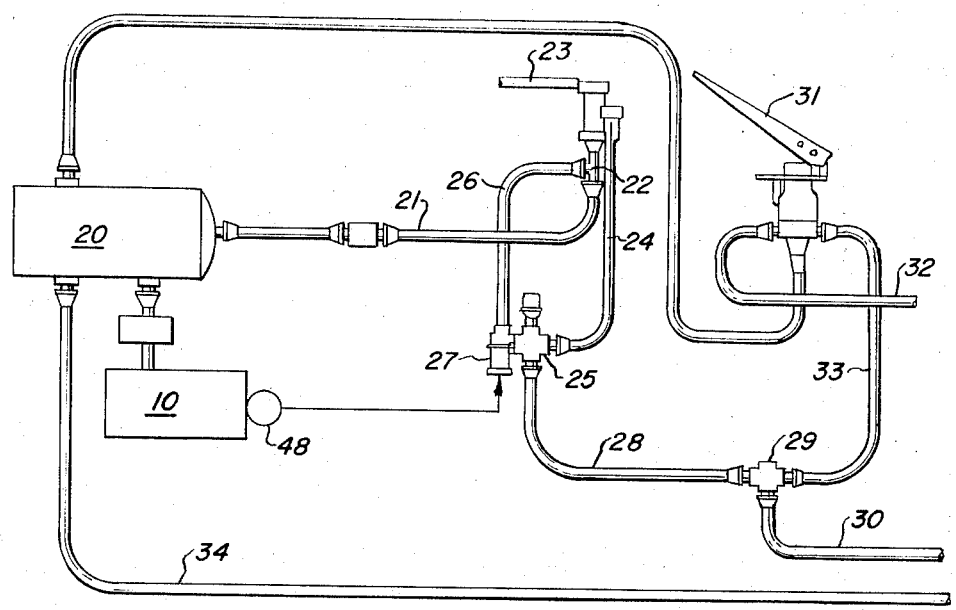
FIG. 2 is a diagram of a pneumatic braking system of the vehicle showing the fluidic computer connected to control the vehicle's brake system.

Referring now to the drawings, a schematic diagram of a fluidic computer 10 in accordance with this invention is shown in FIG. 1 wherein the symbology employed is in accordance with MIL STD 1306 entitled "Fluerics, Terminology and Symbols." The computer 10 is shown connected to a pneumatic brake supply system in FIG. 2.

The pneumatic supply system for actuating the brakes of the vehicle is shown in FIG. 2 as including a compressed air storage tank 20 having a main supply line 21 leading to a T-fitting 22 that connects to a hand control valve 23 that regulates air supply over a delivery line 24 which leads to a two-way valve 25. The T-fitting 22 also branches through an air supply line 26 that feeds through a fluidic brake interface valve 27 and then into the two-way valve 25. The fluidic brake interface valve is controlled by a fluidic computer in accordance with this invention, the computer being supplied with air from the storage tank and being controlled by the various sensors previously described. A delivery line 28 leads from the two-way valve 25 to another two-way valve 29 that is connected to a service line 30 leading to the tractor protection valve which is to be controlled automatically in the event of the driver failing to satisfy the predetermined conditions established by the alertness system.

Another air supply line leads from the storage tank 20 to a foot valve 31 which has one outlet line 32 leading directly to the tractor brakes and another outlet line 33 leading to the two-way valve 29.

Under conventional operating conditions, the hand control valve 23 establishes a supply path through the delivery lines 24, 28 and through the two-way valve 29 to the direct supply line 32 to the tractor brakes. Alternatively, the foot valve 31 establishes a supply line directly to the tractor brake line 32.

Under emergency conditions, the fluidic computer 10 establishes a supply path through the delivery line 28 and through the two-way valve 29 to the service line 30 that controls the tractor protection valve. The system is also shown to include an emergency line 34 leading directly from the storage tank 20 to the tractor protection valve.

Figure 3:
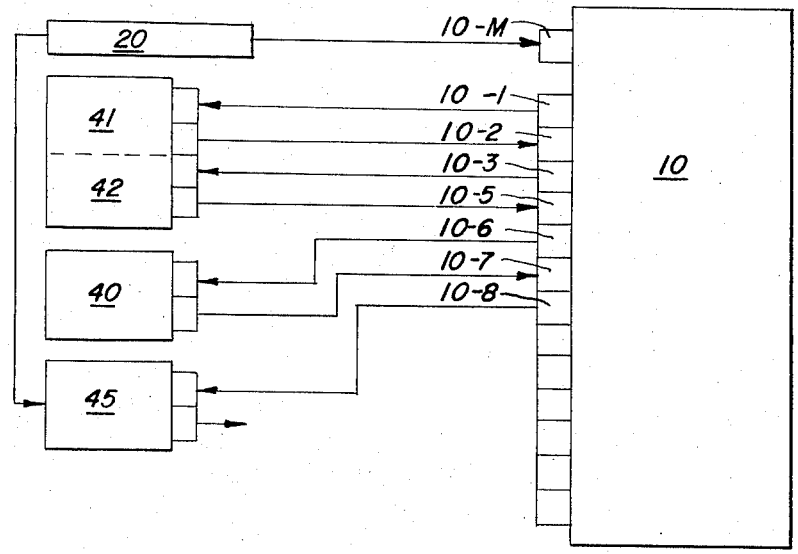
FIG. 3 is a schematic block diagram showing the connection of a set of sensors (position, frequency and velocity) to the fluidic computer.

In accordance with the block diagram of FIG. 3, the fluidic control circuit is supplied with input signals from a velocity sensor 40, a steering wheel position sensor 41 and a steering wheel movement frequency sensor 42. In the particular embodiment described herein, the velocity sensor 40 is connected to prevent operation of the control circuit unless the vehicle has a minimum forward velocity of thirty (30) miles per hour. The steering position sensor 41 is connected to prevent operation of the control circuit unless the position of the steering wheel is within 20° on either side of an imaginary line oriented parallel to the longitudinal axis of the vehicle. These constraints prevent the fluidic computer control circuit from producing an output command signal for warning the driver or for applying the vehicle brakes when the vehicle is either operating at low speed or is making a steady state turn such as occurs on a spiral ramp approaching or departing a turnpike or freeway.

The wheel position sensor 41 and the wheel movement frequency sensor 42 may be of the type shown in the Welk application Ser. No. 240,153, filed concurrently herewith on Mar. 31, 1972 and entitled "Fluidic Angular Displacement Sensor," the disclosure of which is specifically incorporated herein by this reference.

The velocity sensor 40 may be of the type shown in the Welk application Ser. No. 240,152, filed concurrently herewith on Mar. 31, 1972 and entitled "Fluidic Pickoff," the disclosure of which is specifically incorporated herein by this reference.

The frequency sensor 42 is provided to control the computer when the driver's wheel movements fall below certain minimum requirements. For example, in the case of the illustrated embodiment, it is based on the criterion that a driver normally should move the steering wheel at least 3° once in every 3 seconds when travelling on normal roads at velocities above 30 miles per hour. When the control circuit is not deactivated either by the velocity sensor 40 or the position sensor 41, its operation will be controlled by the frequency sensor 42. In particular, the frequency sensor 42 is set to provide a control signal to the computer whenever the steering wheel is displaced by three degrees or more. The computer will provide a warning signal if it does not receive a control signal from the frequency sensor 42 in a 3 second interval. The computer will provide a brake actuation signal if it does not receive a control signal from the frequency sensor 42 following an additional 3 second interval.

As shown in FIG. 3, the fluidic control system includes a fluidic block structure 10 which is provided with suitable flow passages and channels to define the various logic elements that constitute the computer system. The block 10 has a manifold input terminal 10M connected to a cempressed air reservoir 20 for supplying system air pressure to each of the fluidic elements located within the block. In addition, the block has an air supply terminal 10-1 connected to the position sensor 41, an air input terminal 10-2 for applying position signals to the block as determined by the position sensor 41, and air supply terminal 10-3 connected to the frequency sensor 42, and air input terminal 10-5 for supplying frequency signals from the frequency sensor 42, an air output terminal 10-6 connected to the velocity sensor 40, an air input terminal 10-7 for supplying velocity signals from the velocity sensor 40, and an air output terminal 10-8 connected to control a power amplifier 45 that is fed from the compressed air reservoir 20 and that in turn connects to the pneumatic braking system of the vehicle.

Referring now to FIG. 1 the computer circuit includes a chain of five binary counter stages represented as gates E,F,G, H,I. An OR/NOR gate J has its output port J-7 connected to an input port E-3 of gate E to be successively fed through the counter stages E to I so that a signal appears at output leg H-13 every 3 seconds and at output leg I-13 every 6 seconds, unless the counter stages are reset. A power stage OR/NOR gate D is shown with control ports D-2 and D-3. The OR output leg D-9 of the amplifier D is connected to each of the binary counter stages E to I for resetting each stage to zero by applying a fluidic input signal to its -1 control port.

The velocity sensor 40 is connected to supply a signal to control port A-8 of an OR/NOR gate A which has an output leg A-10 connected to a control port C-3 of an OR/NOR gate C to control its output port C-7 which is in turn connected to the control port D-3 of the power stage D. Correspondingly, the wheel position sensor 41 is connected to apply a fluidic signal to the control port B-5 of an OR/NOR gate B which has an output port B-7 connected to a control port C-2 of the OR/NOR gate C for holding the output of gate C to output port C-7 that connects to control port D-3. The multiple OR output signals of gate D, being connected to each of the reset control ports (-1) of the five binary counter stages E to I, function to stop the action of the counter and to remove output signals from the output legs H-13 and/or I-13.

In summary, if the vehicle velocity is less than 30 miles per hour or if the wheel displacement is greater than 20° or if both conditions exist, the binary counter stages E,F,G, H,I will be stopped and reset and the 3 second and 6 second signals will be removed from the output legs H-13, I-13 respectively. Conversely, when the vehicle's velocity is 30 miles per hour or greater and the steering wheel position is within 20° of center, the gate C is not switched and its NOR output leg C-9 applies a signal to a piston-type fluidic indicator to show that the system is "ON" and that the binary counter stages are active. Under these conditions, the power stage amplifier gate D is vented to atmosphere through its NOR leg.

The counter stages E to I are driven by a fluidic oscillator which consists of the OR/NOR gate J having its NOR output leg J-9 connected in a feedback path 46 that includes an RC network and that terminates at an input control port J-2. Typically, the fluidic oscillator operates at a frequency of 5.33 HZ per second. As previously described, the OR output leg J-7 of the oscillator gate is applied to the control port E-3 of the first binary counter stage E to operate the states successively for producing the 3 second and 6 second signals as described.

The wheel movement frequency sensor 42 is connected to apply a fluidic signal each time the steering wheel is shifted 3° from its previous position, the signal being applied to a control port K-3 of an OR/NOR gate K. The gate K has its OR output leg K-13 connected to an input control port L-3 of a leading edge shaper element L which serves to shape input signals into a square wave form regardless of the signal duration. The shaper element L supplies an output at its leg L-11 which is connected to the other control port D-2 of the power stage D. The control port D-2 is also effective to actuate the OR output leg D-9 of the amplifier D which serves to reset the binary counter stages to zero whenever the steering wheel displacement exceeds 3° from its previous position.

A flip-flop element M has an input control port M-2 connected to the output leg H-13 of counter stage H so that when a 3 second signal is developed at output leg H-13, the output of flip-flop M is switched to leg M-7. In the absence of such a signal, the output of flip-flop M is held vented to atmosphere by application of a signal from the OR output of amplifier D to input control port M-5. The output port M-7 is shown connected to a control port N-4 of the OR/NOR gate N which has its NOR output port N-9 connected to control a fluidic interface valve O which is normally supplied with air at a pressure of 60 psi for driving an air horn 47 that produces a warning signal in the form of a pulsating blast during the interval when a signal is present at output port N-9 of the OR/NOR gate N. The pulsating action is developed by providing a connection from the output port E-13 of counter stage E to an input control port N-2 of the gate N. The frequency of the signal supplied from port E-13 is 2.66 cycles per second, one-half that of the oscillator J.

If the driver responds to the horn 47 within the next 3 second interval, for example, by turning the steering wheel 3°, a signal is applied from the frequency sensor 42 through gates K and L to the control port D-2 of the power amplifier D to effect reset of the binary counter stages, thereby terminating the signal output at port H-13 which in turn resets gates M and N to turn off the valve to the air horn.

In the event the driver does not react during the succeeding 3 second interval, the continued action of the binary counter will develop a signal at the outlet port I-13 which is applied to a control port P-2 of a flip-flop element P. The presence of this signal indicates that the steering wheel has not been moved at least 3° in the preceding 6 seconds and it acts to switch the output of amplifer P from vent to output port P-8 which is connected to the control port of a fluidic interface valve Q. The valve Q is supplied with air from the pneumatic braking system of the vehicle and its output 48 is connected to the fluidic brake interface valve 27 to control the pneumatic braking system.

The braking arrangement is set up to prevent release of the brakes until after the vehicle has come to a complete stop. A remote reset control 50 for effecting release of the brakes functions as a fluidic back pressure sensor. The control 50 is in the form of a T-shaped section of metal tubing supplied with compressed air at one connection 50-1, having another connection 50-2 vented to atmosphere and having the third connection 50-3 connected to the control port R-2 of an OR/NOR gate R.

When the vented end 50-2 of the back pressure sensor 50 is open to atmosphere, the output of gate R appears at its NOR leg which is vented to atmosphere. When the vented end 50-2 of the back pressure sensor is closed, as by covering it with a finger, a signal is supplied to the control port R-2 to switch the gate R to supply output at its OR legs R-7, R-8. Leg R-7 is connected to the control port P-6 of the flip-flop P to switch the output of the flip-flop P to the vent leg, thereby releasing the brakes when a finger is applied to the back pressure sensor. The output port R-8 is connected to control port C-1 of the OR/NOR gate C to apply a signal for switching the gate C from its NOR output leg C-9 to its OR output leg C-7. Output from the leg C-9 had normally indicated that the system was operating and upon removal of output at C-9, the indicator 51 switches from ON to OFF. When the signal is developed at the output port C-7, it actuates a control port D-3 to produce a signal at the OR output leg which resets the binary counters and silences the warning alarm.

ALTERNATIVE EMBODIMENT

Figure 4:
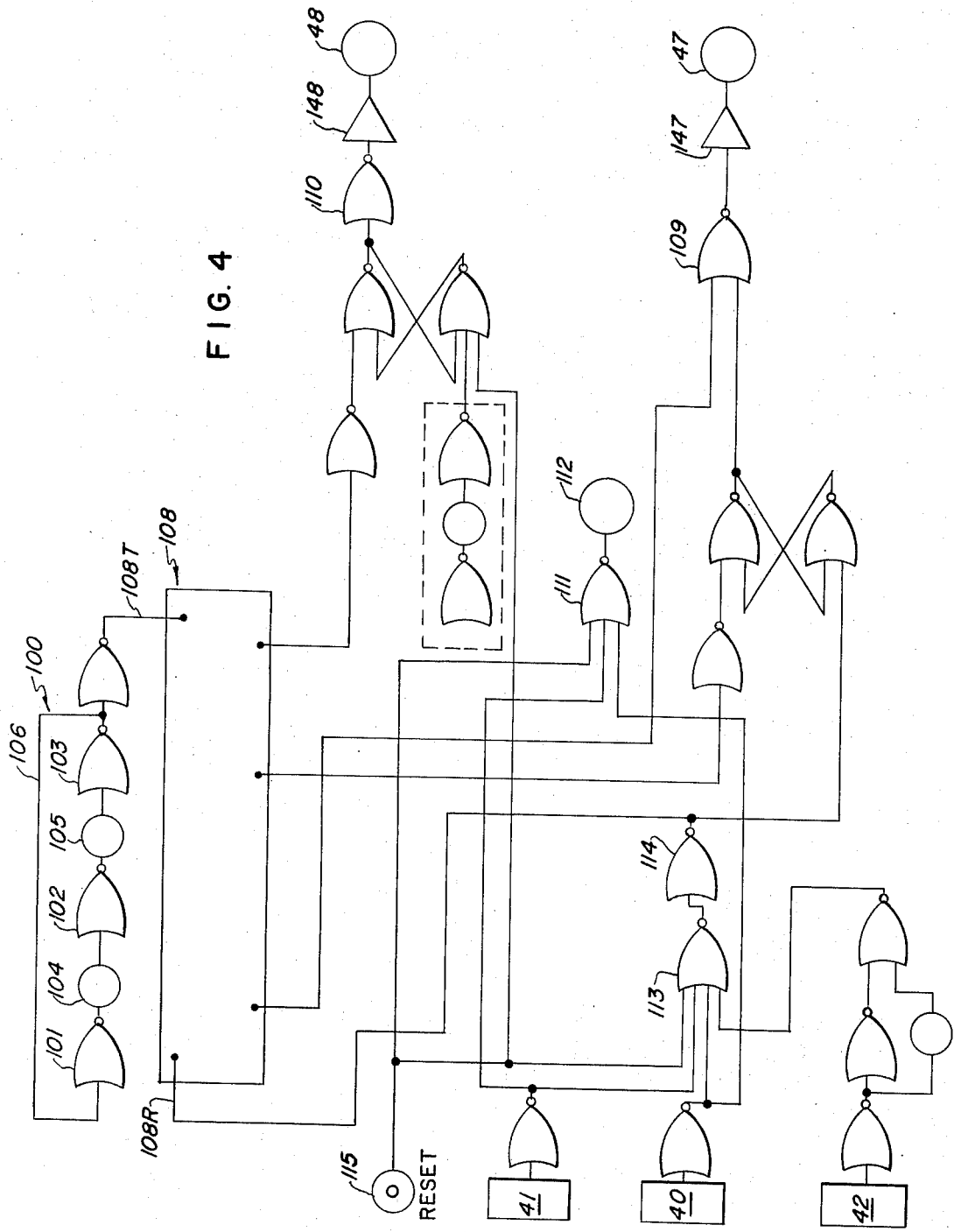
FIG. 4 is a schematic diagram showing an alternate control circuit using NOR logic only to perform the computing function required.

In FIG. 4, there is shown a echematic diagram of a fluidic computer control circuit which utilizes only NOR logic to perform the required computing functions. The operating requirements and functions are the same as for the circuit of FIG. 1. USASI symbology is used in the schematic diagram of FIG. 4 since all of the logic elements therein are identical NOR gates.

It may be seen in FIG. 4 that the control circuit is supplied with input signals from the identical set of sensors which include the vehicle velocity sensor 40, the wheel position sensor 41, and the wheel movement frequency sensor 42. The output of the circuit is shown to be connected to a power amplifier 147 to an air horn 47 and also through a power amplifier 148 to the brake actuating valve 48.

In the NOR system of FIG. 4, the timing is determined by a high frequency oscillator circuit 100 that incorporates a chain of three NOR gates 101, 102, 103 successively connected by intermediate delay elements 104, 105 and bridged by a feedback line 106.

The oscillator circuit 100 feeds a trigger terminal 108T on an 8 stage frequency divider circuit 108 that is connected to provide an actuating signal to the NOR gate 109 that drives the horn amplifier 147 after 3 seconds and is connected to provide an actuating signal to the NOR gate 110 that drives the brake amplifier 148. The wheel position sensor 41 and velocity sensor 40 are connected to a NOR gate 111 that controls an ON indicator 112. In addition, each of the sensors 40, 41, 42 is connected through an intermediate NOR gate 113 which supplies a further NOR gate 114 to control a reset terminal 108R of the frequency divider 108. A reset control 115 for effecting release of the brakes is a fluidic back pressure sensor.

The circuit of FIG. 4 provides the same mode of operation as the circuit of FIG. 2 in that the sensors function based on the same requirements of wheel position and velocity and wheel movement frequency to produce a 3 second warning signal for operating the horn 47 and to produce a 6 second brake signal which remains effective until the vehicle comes to a stop, at which point the circuit may be reset by manual operation of the back pressure sensor 115.

Thus, while preferred constructional features of the invention are embodied in the structure illustrated herein, it is to be understood that changes and variations may be made by those skilled in the art without departing from the spirit and scope of the appended claims.

What is claimed is:

1. A fluidic driver alertness and braking control system for a vehicle controlled by a steering wheel and comprising a fluidic computer comprised solely of fluidic logic means operable with low pressure air having inputs responsive to signals representative of vehicle velocity, steering wheel movement and having outputs to control a driver warning device and a brake actuating device, said outputs being operable by compressed air and being responsive to said fluidic computer outputs for controlling the driver warning device and the brake actuating device, said fluidic computer having a fluidic oscillator, a fluidic counter comprising a chain of binary counter stages responsive to the oscillator to produce a warning signal from one of said stages when a predetermined count occurs and an actuating signal from another of said stages when a higher predetermined count occurs, fluidic logic means responsive to the signal representative of steering wheel movement and connected to reset the counter to zero whenever a predetermined wheel movement occurs, and fluidic logic means responsive to the signal representative of vehicle velocity and connected to enable the fluidic computer to operate only when a predetermined vehicle velocity is exceeded.

2. A control system as defined in claim 1 and wherein said fluidic computer is comprised solely of fluidic logic means operable with low pressure air and means operable by compressed air are responsive to said fluidic computer outputs for controlling the driver warning device and the brake actuating device.

3. A control system as defined in claim 1 and wherein the vehicle includes a manually controlled compressed air supply path connected from a compressed air source to the vehicle air brake line for manually controlling the brake actuating device, a bypass line bridging a portion of said supply path, and wherein said fluidic computer inputs are responsive to signals generated by air from said source, and said fluidic computer output for controlling the brake actuating device is connected to complete said bypass line.

4. A control system as defined in claim 1 wherein said computer has an input responsive to actual steering wheel position to prevent operation except when the position of the steering wheel is within a predetermined angle on either side of a straight ahead wheel position and wherein the computer input representative of wheel movement produces a signal whenever the wheel is rotated through a predetermined angle within a specified time interval.

5. A control system as defined in claim 1 wherein said system includes a fluidic block structure having internal flow passages and channels constituting the fluidic logic means of the computer, said block structure having a manifold input terminal connected to receive compressed air for the fluidic logic means within the block structure, said block structure having air input terminals to receive said inputs and supply the same to control said fluidic logic means.

* * * * *

UNITED STATES PATENT OFFICE
CERTIFICATE OF CORRECTION

Patent No. 3,788,357                                  Dated January 29, 1974

Inventor(s) Horace B. Welk, Jr.

It is certified that error appears in the above-identified patent and that said Letters Patent are hereby corrected as shown below:

Column 2, line 9, change "typeS" to --types--.

Column 4, line 54, change "states" to --stages--.

Column 6, line 12, change "echematic" to --schematic--.

Column 8, line 5, change "saId" to --said--.

Signed and sealed this 17th day of September 1974.

(SEAL)
Attest:

McCOY M. GIBSON JR.
Attesting Officer

C. MARSHALL DANN
Commissioner of Patents